United States Patent
Sasaki et al.

(10) Patent No.: US 7,785,181 B2
(45) Date of Patent: Aug. 31, 2010

(54) GAME PROGRAM AND GAME APPARATUS

(75) Inventors: Jun Sasaki, Tokyo (JP); Yoshikazu Fujita, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 822 days.

(21) Appl. No.: 11/714,180

(22) Filed: Mar. 6, 2007

(65) Prior Publication Data

US 2008/0120460 A1 May 22, 2008

(30) Foreign Application Priority Data

Nov. 22, 2006 (JP) ............................. 2006-314998

(51) Int. Cl.
*A63F 9/24* (2006.01)
*A63F 13/00* (2006.01)
(52) U.S. Cl. ............................................. 463/9; 463/10
(58) Field of Classification Search ........................ None
See application file for complete search history.

(56) References Cited

U.S. PATENT DOCUMENTS 5,265,888 A * 11/1993 Yamamoto et al. ............ 463/10

FOREIGN PATENT DOCUMENTS

| JP | 10-066784 | 3/1998 |
|---|---|---|
| JP | 2000-271348 | 10/2000 |
| JP | 2005-334356 | 12/2005 |

\* cited by examiner

*Primary Examiner*—M. Sager
(74) *Attorney, Agent, or Firm*—Nixon & Vanderhye PC

(57) ABSTRACT

When an operation block collides a stacked block in an X-direction, a part of the stacked block facing an operation block is shifted to the X-direction to allow the operation block to be absorbed in the stacked block and an end being opposite to the end facing the operation block of the shifted stacked block to be ejected from the stacked block. The ejected block can collide with the stacked block again as an operation block. Such a collision operation is repeatedly performed after the completion of a predetermined arrangement in the stacked block.

11 Claims, 13 Drawing Sheets

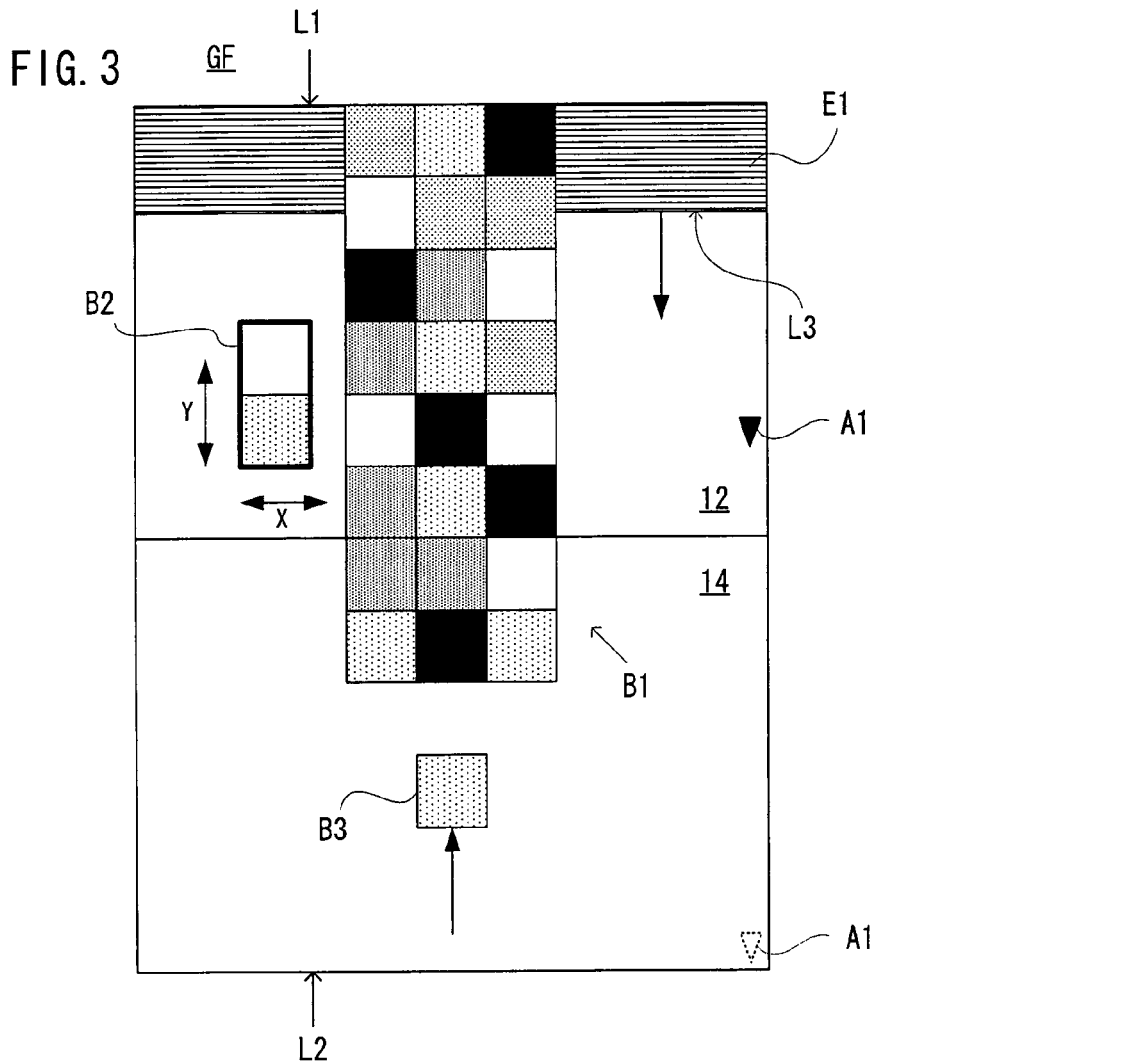

FIG. 5 (A)
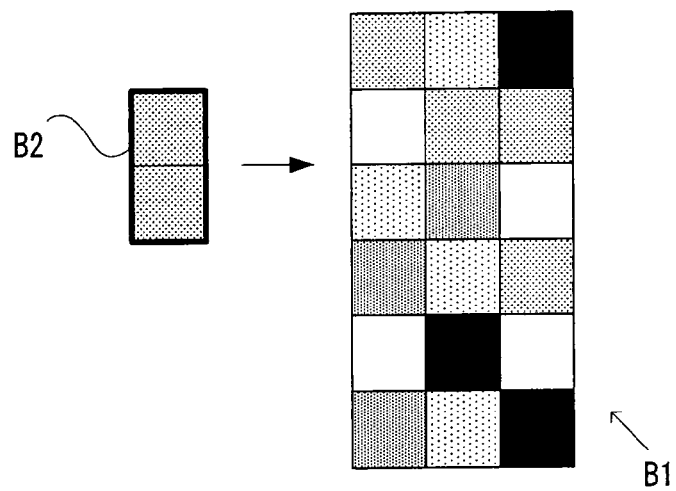
(B)
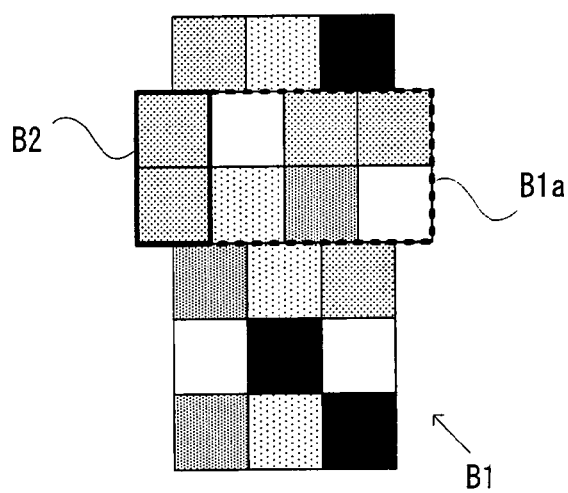
(C)
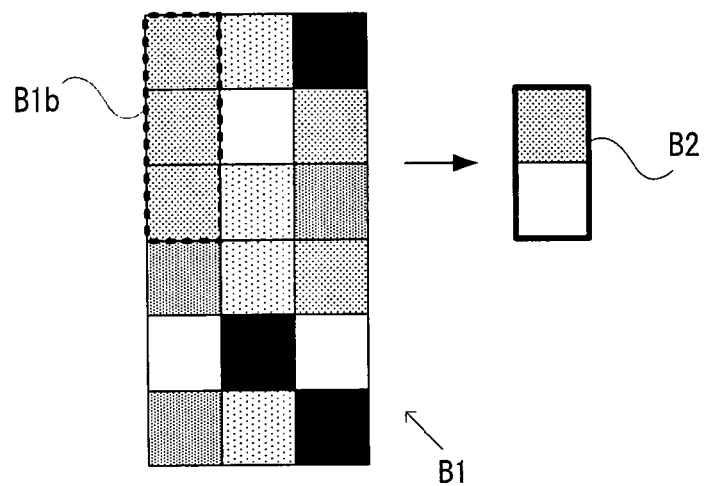

FIG. 6
(A)
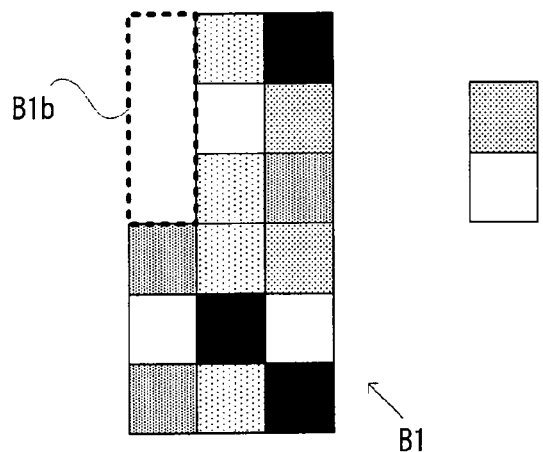
(B)
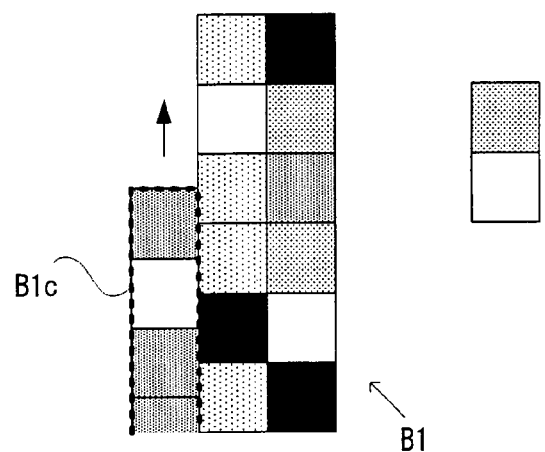
(C)
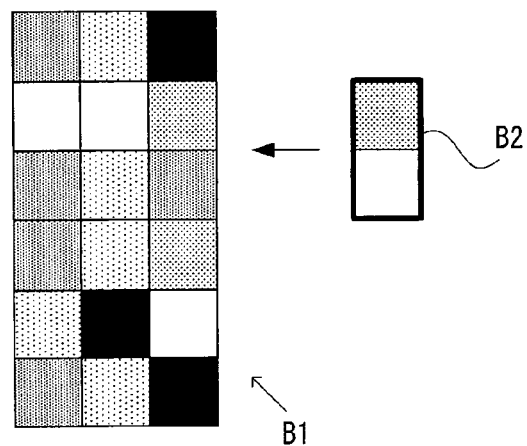

FIG. 7
(A)
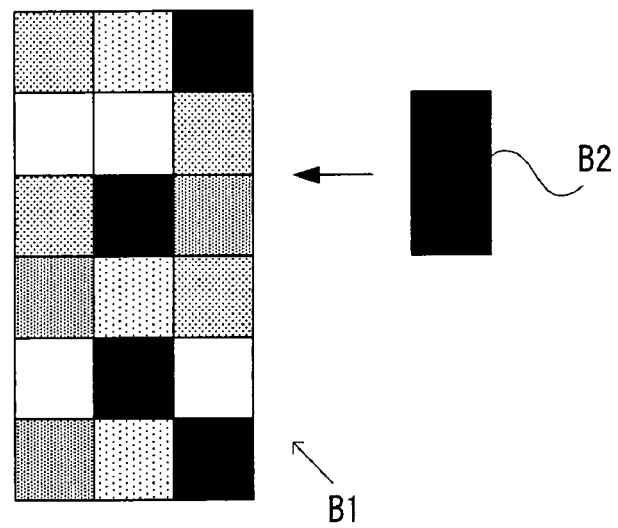
(B)
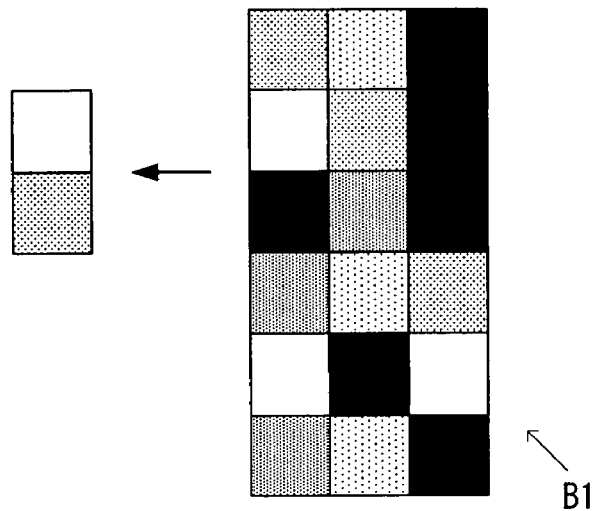

FIG. 8
(A)
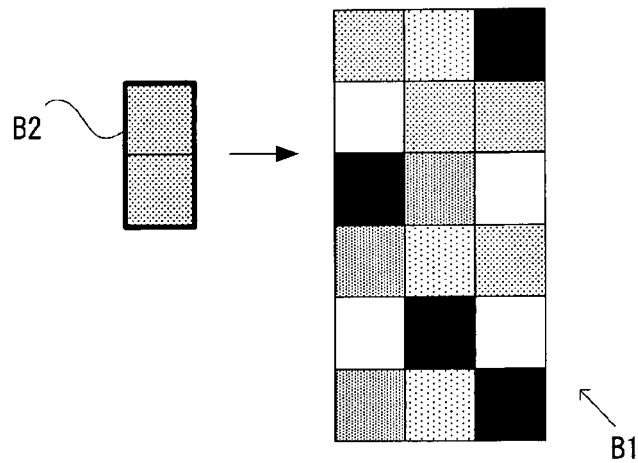
(B)
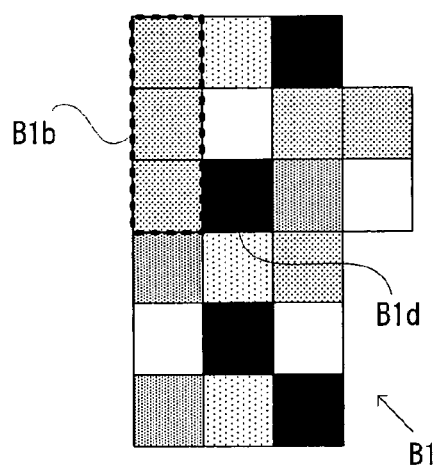
(C)
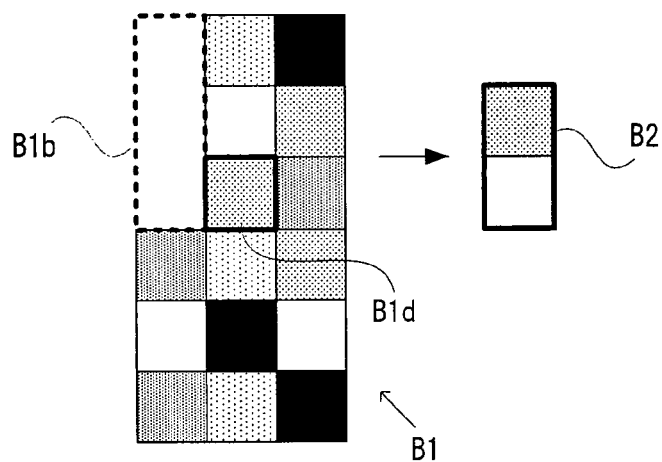

FIG. 10
(A)
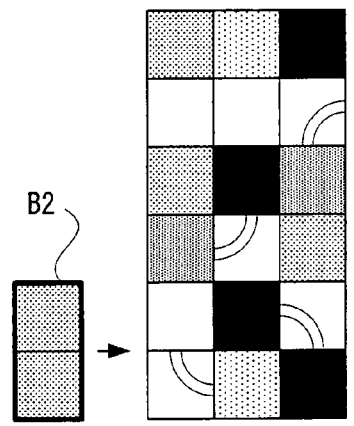
(B)
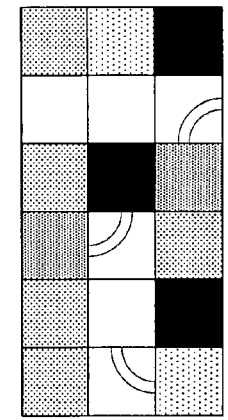
(C)
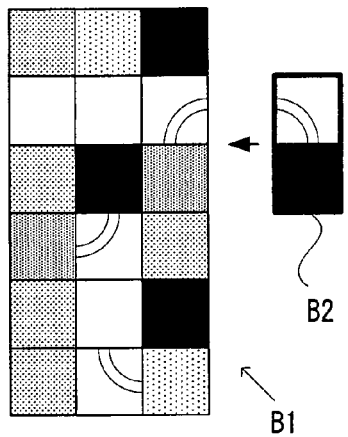
(D)
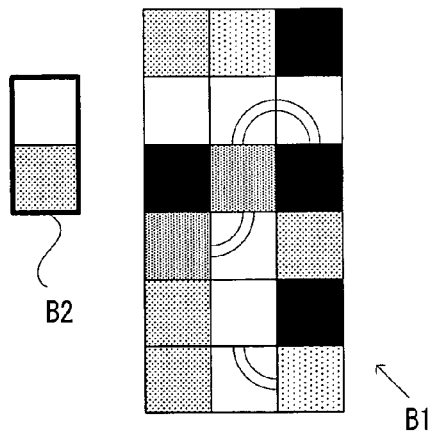

GAME PROGRAM AND GAME APPARATUS

CROSS REFERENCE OF RELATED APPLICATION

The disclosure of Japanese Patent Application No. 2006-314998 is incorporated herein by reference.

BACKGROUND OF THE INVENTION

1. Field of the Invention

The present invention relates to a game program and a game apparatus. More specifically, the present invention relates to a game program and a game apparatus which make a block disappear out of a group of stacked blocks formed in a game field by completing a predetermined arrangement.

2. Description of the Related Art

As a program or device of such a kind, ones disclosed in the respective Japanese Patent Laying-open No. 2000-271348 (Patent Document 1), Japanese Patent Laying-open No. 2005-334356 (Patent Document 2), and Patent Laying-open No. 10-66784 (Patent Document 3) are known. In the related art of Patent Document 1, a block upwardly moving is sequentially generated on the bottom side of the game field so as to be stacked and formed in stacked blocks on the top side of the game field. When a player operates a lever, the horizontal position of the block upwardly moving is changed.

In the related art of Patent Document 2, a block downwardly moving is sequentially generated on the top side of the game field, and these blocks are stacked on the bottom side of the game field to form stacked blocks. When a pair of blocks adjacent to each other in the stacked blocks is surrounded with a cursor by a player, these blocks change places with each other.

In the related art of Patent Document 3, stacked blocks are formed in the game field as in Patent Document 2. When a player moves a cursor holding a block for exchange to any position of one of the stacked blocks, the block held with the cursor and the block in the stacked blocks are exchanged.

However, in the related art of Patent Document 1, a player's operation is directly performed on only the block during moving, and therefore, it is difficult to rearrange the stacked blocks which have already been formed. In the related art of Patent Document 2, an operation is directly performed on the stacked blocks, but adjacent pair of blocks merely change their places. In the related art of Patent Document 3, one block is exchanged for another one.

Thus, in the related arts, an arrangement of stacked blocks stand still in response to an operation by a player or only changed in a localized manner, thus, being free from an uplifting feeling to move a block and a strategic characteristic to make a block disappear by completing a predetermined arrangement.

SUMMARY OF THE INVENTION

Therefore, it is a primary object of the present invention to provide a novel game program and a game apparatus.

Another object of the present invention is to provide game program and a game apparatus capable of enhancing an uplifting feeling and a strategic characteristic.

A game apparatus (10: reference numeral designating a portion corresponding in the embodiments) to which the present invention is applied comprises an operating means (18) to be operated by a player, a display means (12, 14) for displaying a game field (GF) including an operation block (B2) as an object to be controlled by the operating means and a group of blocks (B1) formed by blocks to be erased when an arrangement condition is satisfied, a first storing means (94) for storing each of attribute data and position data as to the operation block; and a second storing means (96) for storing each of attribute data and position data as to the group of blocks for each block.

A game program in accordance with a first invention causes a computer (42) of the game apparatus to execute following steps of: a moving step (S7-S11) for moving the operation block within the game field by updating the position data of the first storing means in response to an operation by the operating means; a collision determining step (S13) for determining on the basis of the position data of the first storing means and the position data of the second storing means whether or not the operation block collides the group of blocks within the game field; an absorbing step (S15) for, when the determination result by said collision determining step is affirmative, absorbing said operation block in said group of blocks by shifting a first part of blocks (B1a) facing said operation block and aligned in a moving direction of said operation block in said group of blocks to said moving direction by updating a part of the position data of said second storing means and moving each of the attribute data and the position data of said first storing means to said second storing means to thereby; and an ejecting step (S17) for ejecting an end being opposite to the end of said first part of blocks facing said operation block as a new operation block from said group of blocks in accordance with the absorbing process by said absorbing step by moving a part of the attribute data of said second storing means to said first storing means and updating the position data of said first storing means.

In the first invention, a game field displayed on a display means includes an operation block as an object to be controlled by the operating means and a group of blocks formed by a block to be erased when an arrangement condition is satisfied. A first storing means stores each of attribute data and position data as to the operation block, and a second storing means stores each of attribute data and position data as to the group of blocks for each block. When a player operates the operating means, the position data of the first storing means is updated by a moving step to move the operation block within the game field.

A collision determining step determines on the basis of the position data of the first storing means and the position data of the second storing means whether or not the operation block collides the group of blocks within the game field. If the determination result is affirmative, an absorbing step updates a part of the position data of the second storing means and moves each of the attribute data and the position data of the first storing means to the second storing means to thereby shift a first part of blocks facing the operation block and aligned in a moving direction of the operation block in the group of blocks to the moving direction, allowing the operation block to be absorbed in the group of blocks.

According to the absorbing process, an ejecting step moves a part of the attribute data of the second storing means to the first storing means and updates the position data of the first storing means to thereby eject an end being opposite to the end of the first part of blocks facing the operation block as a new operation block from the group of blocks.

In accordance with the first invention, when the operation block is moved so as to collide a group of blocks, a first part of blocks is shifted in the group of blocks to allow the operation block to be absorbed in the group of blocks, and an end being opposite to the end of the first part of blocks facing the operation block is ejected from the group of blocks. The block thus ejected can collide with the group of blocks as a new operation block. By repeating such a collision operation, an arrangement of the blocks can be dynamically changed, thus capable of enhancing a strategic characteristic of the game in which a block disappears by completing a predetermined arrangement in a group of blocks.

A game program in accordance with a second invention is dependent on the first invention. Within the game field, the group of blocks arranged at the center of a first (X) direction, and has a stacked structure in which blocks are paved in both of the first direction and a second (Y) direction crossing the first direction. Within the game field, the operation block is arranged on one side with respect to the group of blocks in the first direction, and moves in any one of the first direction and the second direction in response to an operation by the operating means.

The collision determining step determines whether or not the operation block collides with the group of blocks in the first direction. The absorbing step absorbs the operation block in one end of the group of blocks in the first direction by shifting the first part of blocks in the first direction, and the ejecting step ejects the new operation block from the other end of the group of blocks in the first direction.

In accordance with the second invention, blocks are arranged and moved by taking the first direction and the second direction as a reference within the game field to visually rearrange the game field, capable of improving comfortability. Additionally, in a preferred embodiment, an addition block (B3) moving in the second direction is sequentially thrown in the game field to be brought into contact with and be a part of a group of blocks. However, since a collision direction of an operation block against group of blocks shall be the first direction, the collision operation does not prevent the addition block input process.

A game program in accordance with a third invention is dependent on the first or the second invention, and causes a computer to further execute following steps of an arrangement determining step (S23) for determining whether or not blocks having the same attribute in the group of blocks is in a first arrangement on the basis of each of the attribute data and the position data of the second storing means; and an erasing step (S27) for erasing a second part of blocks (B1b) including blocks having the same attribute and being in the first arrangement within the game field by updating each of the attribute data and the position data of the second storing means when the determination result by the arrangement determining step is affirmative.

In the third invention, the arrangement condition includes a condition that blocks having the same attribute in the group of blocks are in the first arrangement. Thus, if blocks having the same attribute are in the first arrangement in the group of blocks, these blocks are erased from the group of blocks. Additionally, in a preferred embodiment, when three or more blocks in the same color are arranged in at least one of the first direction and the second direction, these blocks are erased.

A game program in accordance with a fourth invention is dependent on the third invention, and causes a computer to further execute a removing step (S25) of removing a block having an attribute of unerasable from an object to be erased by the erasing step.

In the fourth invention, a block having an attribute of unerasable is removed from an object to be erased by a removing step. That is, even if the arrangement condition is satisfied, the block is not erased. Thus, it is possible to increase difficulty of the game.

A game program in accordance with a fifth invention is dependent on a fourth invention, and causes a computer to further execute following steps of: a presence determining step (S29) for determining whether or not an adjacent unerasable block (B1d) being adjacent to the second part of blocks and having an attribute of unerasable is present by referring to each of the position data and the attribute data of the second storing means when the determination result by the arrangement determining step is affirmative; and an attribute changing step (S31) for changing the attribute of the adjacent unerasable block to an attribute the same as that of the second part of blocks by updating a part of the attribute data of the second storing means when the determination result by the presence determining step is affirmative.

In the fifth invention, when the determination result by the arrangement determining step is affirmative, whether or not an adjacent unerasable block being adjacent to the second part of blocks and having an attribute of unerasable is present is determined on the basis of each of the position data and the attribute data of the second storing means. If the determination result is affirmative, the attribute changing step updates a part of the attribute data of the second storing means, and thus, the attribute of the adjacent unerasable block is changed to the attribute the same as that of the second part of blocks.

In accordance with the fifth invention, the adjacent unerasable block becomes erasable in response to erasure of the second part of blocks. Thus, it is possible to relive difficulty of the game by reducing the number of unerasable blocks.

A game program in accordance with a sixth invention is dependent on any one of the third to the fifth inventions. The game apparatus further comprises a third storing means (104) for storing level clear index data indicative of to what extent the number of erased blocks is close to a level clear reference. Then, the game program causes a computer to further execute following steps of: a counting step (S33) for counting the number of blocks erased by the erasing step; a first index updating step for updating level clear index data of the third storing means on the basis of the counting result by the counting step; a first index updating step (S35) for updating level clear index data of the third storing means on the basis of the counting result by the counting step; an offering step (S43) for offering an assignment through the display means when the updating result by the first index updating step indicates attainment of the level clear reference; a solution determining step (S45) for determining whether or not the assignment offered by the offering step is solved by an operation of the operating means; and a level-clearing step (S51) for executing a level-clearing process to proceed to a new game level when the determination result by the solution determining step is affirmative.

In the sixth invention, level clear index data indicative of to what extent the number of erasable blocks is close to a level clear reference is stored in the third storing means. A counting step counts the number of blocks erased by the erasing step, and a first index updating step updates level clear index data of the third storing means on the basis of the counting result by the counting step.

An offering step offers an assignment through the display means when the updating result by the first index updating step indicates attainment of the level clear reference. Whether or not the offered assignment is solved through an operation by the operating means is determined by a solution determining step. A level-clearing step executes a level-clearing process to proceed to a new game level when the determination result by the solution determining step is affirmative.

In accordance with the sixth invention, only when the reference is attained, and the assignment is solved, the game process can advance to a new level, and therefore, it is possible to increase difficulty and variety of the game.

A game program in accordance with a seventh invention is dependent on the sixth invention. The offering step causes a level-clear assignment block having an attribute of level-clear assignment to appear at a random position within the group of blocks by updating a part of the attribute data of the second storing means. The solution determining step determines whether or not the level-clear assignment block is in a second arrangement within the group of blocks on the basis of each of the attribute data and the position data of the second storing means.

In the seventh invention, a level-clear assignment block arranged at a random position within the group of blocks is offered. Then, the arrangement of blocks are changed by a collision operation, and if the level-clear assignment block is in the second arrangement within the group of blocks, it is determined that the assignment is solved.

In accordance with the seventh invention, within a framework in which the arrangement of blocks is changed by a collision operation, it is possible to give variety to the game.

A game program in accordance with an eighth invention is dependent on the sixth or the seventh invention, and the game field further includes a first character (A1) moving in accordance with the updating process by the first index updating step.

In the eighth invention, a first character moving as the number of erased blocks increases is displayed within the game field.

In accordance with the eighth invention, a player can intuitively confirm a degree of attainment to the level clear reference, capable of enhancing comfortability.

A game program in accordance with a ninth invention is dependent on any one of the sixth to the eighth inventions. The game apparatus further comprises: a timer (T) for counting an elapsed time from a game start; and a fourth storing means (102) for storing game over index data indicative of a remaining time until the game over. The game program causes the computer to further execute a second index updating step (S37) for updating game over index data of the fourth storing means on the basis of the timer value and the counting result by the counting step. Then, the game field further includes a second character (L3) moving in accordance with the updating process by the second index updating step.

In the ninth invention, the elapsed time from the game start is counted by a timer, and game over index data indicative of a remaining time until the game over is stored in the forth storing means. The second index updating step updates game over index data of the fourth storing means on the basis of the timer value and the counting result by the counting step. The second character within the game field moves in accordance with the updating process by the second index updating step.

In accordance with the ninth invention, the remaining time of the game is controlled on the basis of the elapsed time and the number of erased blocks, capable of scoring high and rising player's enthusiasm. Furthermore, by displaying the second character moving in accordance with the remaining time in the game field, it is possible to provoke player's frustrations.

A game program in accordance with a tenth invention is dependent on the ninth invention, and the second character is a game over line extending in the first direction and moving in the second direction within the game field. The game over line advances from one to other of the second direction with the passage of time, and is sent back from the other to the one of the second direction depending on the number of erased blocks. The moving step makes a moving speed of the operation block different depending on where the operation block is in front of the game over line and at the back thereof.

In the tenth invention, in the game field, a game over line extending in the first direction and moving in the second direction within the game field is displayed. The game over line advances from one to other of the second direction with the passage of time, and is sent back from the other to the one of the second direction depending on the number of erased blocks. The moving speed of the operation block, that is, the response to a collision operation is changed before and after the game over line.

In accordance with the tenth invention, by changing the response to the collision operation, it is possible to provide a game different in difficulties, and by relating the change of the response to the game over line, it is possible to further provoke player's frustrations.

A game apparatus (10) in accordance with an eleventh invention comprises: an operating means (18) to be operated by a player; a display means (12, 14) for displaying a game field (GF) including an operation block (B2) as an object to be controlled by the operating means and a group of blocks (B1) formed by a block to be erased when a arrangement condition is satisfied; a first storing means (94) for storing each of attribute data and position data as to the operation block; a second storing means (96) for storing each of attribute data and position data as to the group of blocks for each block; a moving means (S7-S11) for moving the operation block within the game field by updating the position data of the first storing means in response to an operation by the operating means; a collision determining means (S13) for determining whether or not the operation block collides the group of blocks within the game field on the basis of the position data of the first storing means and the position data of the second storing means; an absorbing means (S115) for, when the determination result by said collision determining means is affirmative, absorbing said operation block in said group of blocks by shifting a first part of blocks (B1a) facing said operation block and aligned in a moving direction of said operation block in said group of blocks to said moving direction by updating a part of the position data of said second storing means and moving each of the attribute data and the position data of said first storing means to said second storing means to thereby; an ejecting means (S17) for ejecting an end being opposite to the end of said first part of blocks facing said operation block as a new operation block from said group of blocks in accordance with the absorbing process by said absorbing means by moving a part of the attribute data of said second storing means to said first storing means and updating the position data of said first storing means.

In the eleventh invention, similarly to the first invention, it is possible to dynamically change the arrangement of blocks, capable of increasing a strategic characteristic.

According to the present invention, it is possible to enhance an uplifting feeling and a strategic characteristic of the game in which a block is erased in response to the completion of a predetermined arrangement. Furthermore, it is possible to improve conformability, control difficulty, add variety, and provoke frustrations, thus, capable of draw a player's willingness to challenge.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing a construction of a game screen applied to FIG. 1 embodiment;

FIG. 4 (A) is a table showing an attribute of each of unit blocks included in the game screen in FIG. 3;

FIG. 4 (B) is a table showing an identifier of each element of stacked blocks of the screen in FIG. 3;

FIG. 5 (A)-FIG. 5 (C) are illustrative views showing a changing example of the game screen applied to FIG. 1 embodiment in chronological order;

FIG. 6 (A)-FIG. 6 (C) are illustrative views continued from FIG. 5 (A)-FIG. 5(C);

FIG. 7 (A) and FIG. 7 (B) are illustrative views showing another changing example of a game screen applied to FIG. 1 embodiment in chronological order;

FIG. 8 (A)-FIG. 8 (C) are illustrative views showing the other changing example of a game screen applied to FIG. 1 embodiment in chronological order;

FIG. 10 (A)-FIG. 10 (D) are illustrative views showing a part of a changing process from FIG. 9 (A) to FIG. 9 (B) in chronological order;

DETAILED DESCRIPTION OF THE PREFERRED EMBODIMENTS

Figure 1:
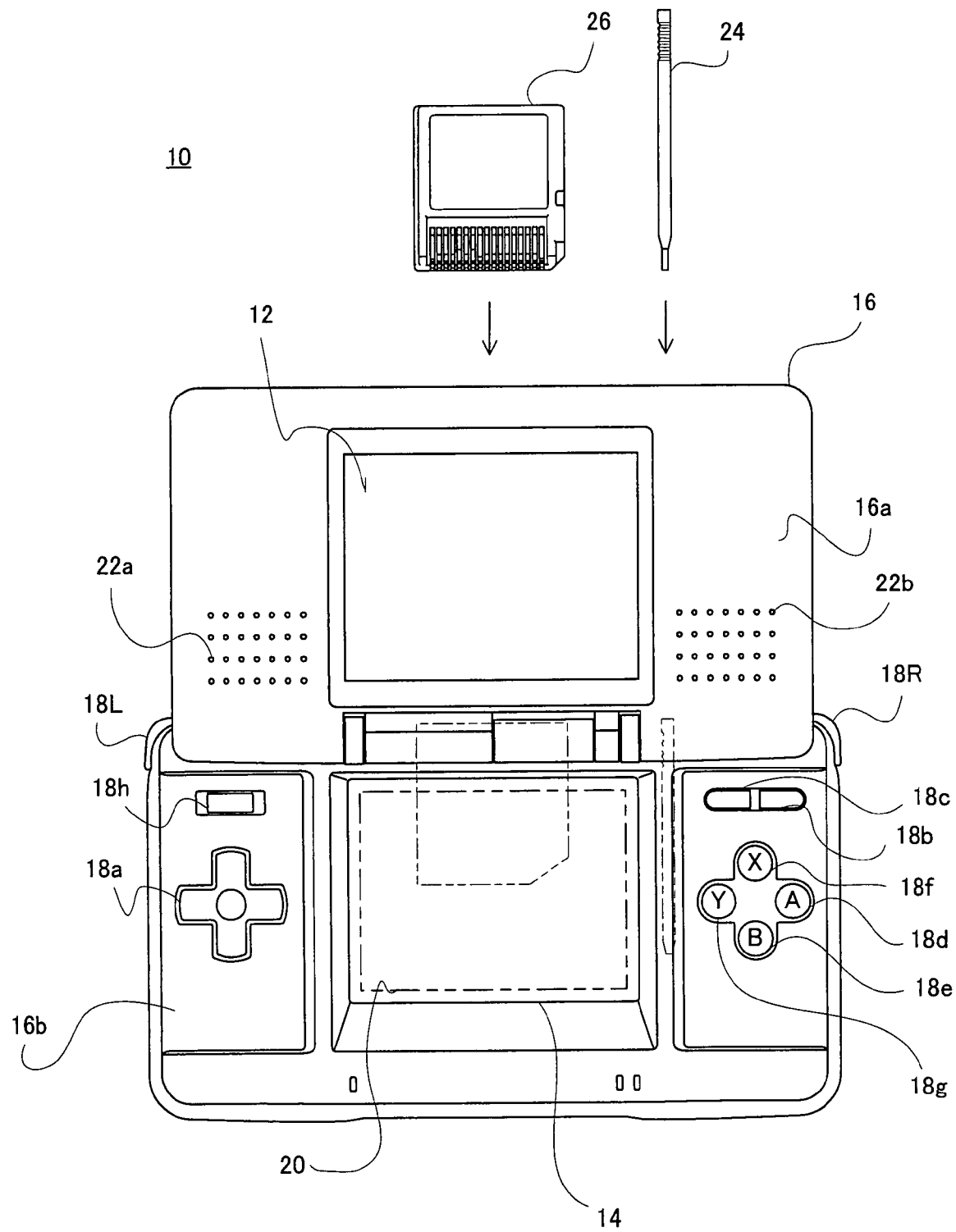
FIG. 1 is an illustrative view showing an appearance in accordance with one embodiment of the present invention.

Referring to FIG. 1, a game apparatus 10 of one embodiment of the present invention includes a first liquid crystal display (LCD) 12 and a second LCD 14. The LCD 12 and the LCD 14 are provided on a housing 16 so as to be arranged in a predetermined position. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, etc. may be used in place of the LCD.

As can be understood from FIG. 1, the upper housing 16a has a plane shape larger than a plane shape of the LCD 12, and has an opening formed so as to expose a display surface of the LCD 12 from one main surface thereof. On the other hand, the lower housing 16b has a plane shape the same order of size as the upper housing 16a, and has an opening formed so as to expose a display surface of the LCD 14 at an approximately center of the horizontal direction. Also, on the upper housing 16a, sound release holes 22a and 22b are symmetrically provided by sandwiching the LCD 12 such that the sound release hole 22a is on the right side, and the sound release hole 22b is on the left side. Furthermore, the housing 16 is formed with various operating switches 18a, 18b, 18c, 18d, 18e, 18f, 18h, 18g, 18L and 18R (referred to as an "operating switch 18" if identification is not needed.)

In addition, the upper housing 16a and the lower housing 16b are connected to be rotated about an axis A at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switch 18 includes the direction instructing switch (cross switch) 18a, the start switch 18b, the select switch 18c, the action switch (A button) 18d, the action switch (B button) 18e, the action switch (X button) 18f, the action switch (Y button) 18g, the power switch 18h, the action switch (L button) 18L, and the action switch (R button) 18R. The switches 18a and 18h are arranged at the left of the LCD 14 on one surface of the lower housing 16b. The switches 18b to 18g are arranged at the right of the LCD 14 on the one surface of the lower housing 16b. Furthermore, the switch 18L and the switch 18R are respectively arranged at the right and left corners sandwiching the connected portion with the upper housing 16a on the upper side surface (top surface) of the lower housing 16b.

The direction instructing switch 18a functions as a digital joystick, and is utilized for instructing a moving direction of a player character (or player object) to be operated by a player and instructing a moving direction of a cursor, and so forth by operating any one of four depression portions. The start switch 18b is formed by a push button, and is utilized for starting (restarting), temporarily stopping (pausing) a game, and so forth. The select switch 18c is formed by the push button, and utilized for a game mode selection, etc.

The action switch 18d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of acquiring an item, selecting and determining arms or command, etc. The action switch 18e, that is, the B button is formed by the push button, and is utilized for changing a game mode selected by the select switch 18c, canceling an action determined by the A button 18d, and so forth.

The action switch 18e, that is, the X button and the action switch 18f, that is, the Y button are formed by the push button, and are utilized for a subsidiary operation button when the game cannot be advanced only with the push button A 22d and the push button B 22e. Of course, the X button and the Y button are not necessarily utilized in the game play. The power switch 18h is a switch for turning on and off the power supply of the game apparatus 10.

The action switch 18L (left depression button) and the action switch 18R (right depression button) are formed by the push button, and the left depression button (L button) 18L and the right depression button (R button) 18R can perform the same operations as the A button 18d and the B button 18e, and can also be utilized for a subsidiary operation of the A button 18d and the B button 18e.

The game apparatus 10 is a game apparatus by means of a touch panel, and attached with a touch panel 20 on a top surface of the LCD 14. As a touch panel 20, any one of kinds of a resistance film system, an optical system (infrared rays system) and an electrostatic capacitive coupling system, for example, can be utilized. In response to an operation by depressing, stroking (touching), and so forth with a stick 24, a pen (stylus pen), or a finger (hereinafter, referred to as "stick or the like 24") on a top surface of the touch panel 20, the touch panel 20 detects a coordinates position of the stick or the like 24 to output coordinates data.

It should be noted that in this embodiment, a resolution of the display surface of the LCD 14 (this is true for the LCD 12) is 228 dots×192 dots, and a detection accuracy of the touch panel 20 is also rendered 228 dots×192 dots in correspondence to the resolution of the display surface. However, the detection accuracy of the touch panel 20 may be lower than the resolution of the display surface, or higher than it.

Thus, the game apparatus 10 has the LCD 12 and the LCD 14 as a display portion of two screens, and by providing the touch panel 20 on a display screen of any one of them (LCD 14 in this embodiment), the game apparatus 10 has the two screens (LCD 12, 14) and the operating portions (18, 20) of two systems.

In addition, in this embodiment, the stick 24 can be housed in the housing portion (housing slot) (not shown) at a position nearer to the side surface (right side) from the center on the upper housing 16a, for example, and taken out as necessary. It should be noted that if the stick 24 is not provided, the housing portion also need not to be provided.

Also, the game apparatus 10 includes a memory card (or game cartridge) 26. The memory card 26 is detachable, and inserted into a loading slot (not shown) provided on a rear surface or an upper edge (side surface) of the lower housing 16b. Although omitted in FIG. 1, a connector 46 (see FIG. 2) is provided at a depth portion of the loading slot for connecting a connector (not shown) provided at an end portion of the memory card 26 in the loading direction, and when the memory card 26 is loaded into the loading slot, the connectors are connected with each other, and therefore, the memory card 26 is accessible by a CPU core 42 (see FIG. 2) of the game apparatus 10.

Although not represented in FIG. 1, inside the lower housing 16b, a right speaker 30a is provided at the position corresponding to the sound release hole 22a, and a left speaker 30b (see FIG. 2) is provided at the position corresponding to the sound release hole 22b.

Furthermore although omitted in FIG. 1, for example, a battery accommodating box is provided on a rear surface of the lower housing 16b, and a volume adjustment knob, an external expansion connector, an earphone jack, etc. are provided on a bottom surface of the lower housing 16b.

Figure 2:
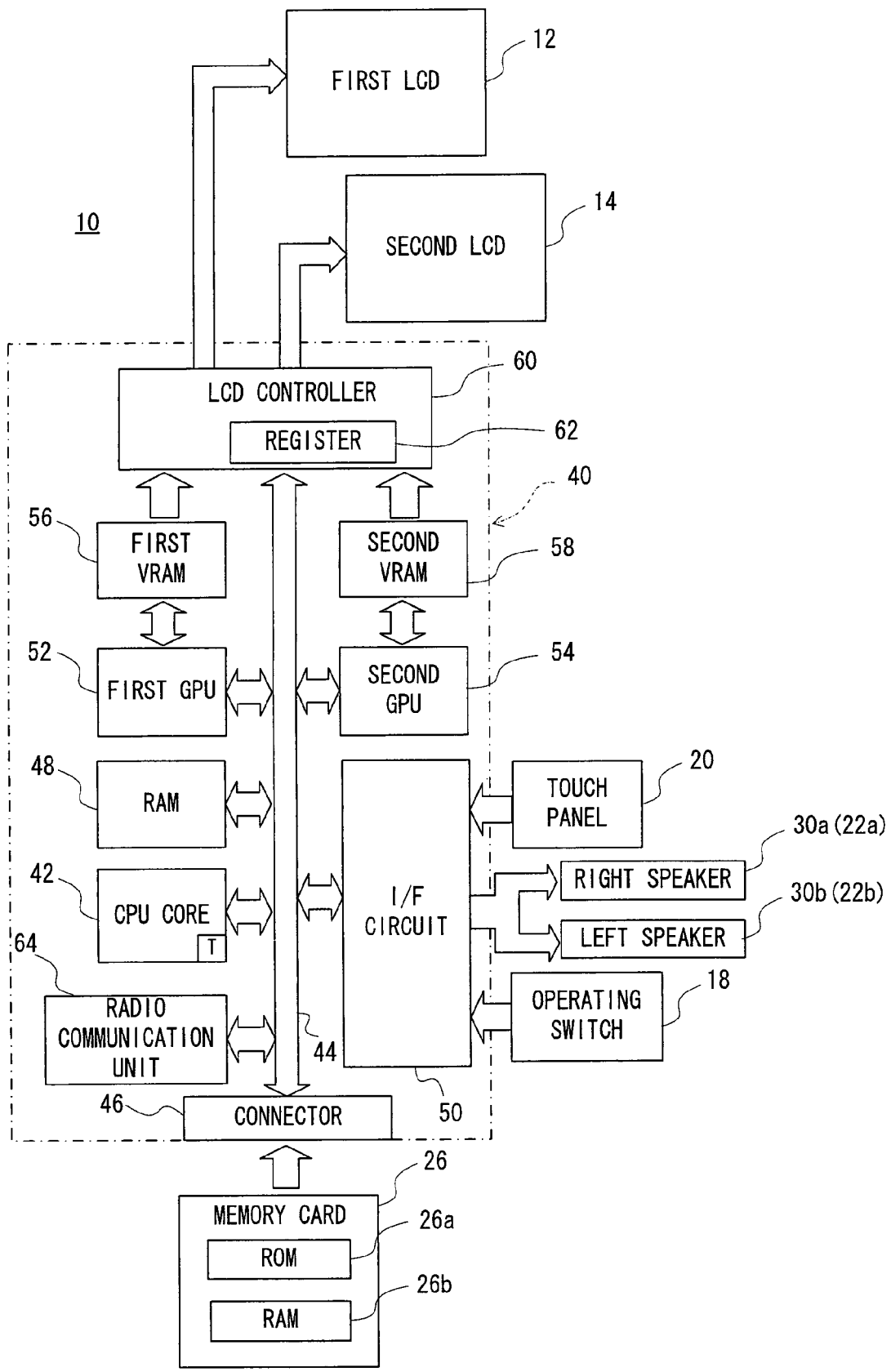
FIG. 2 is a block diagram showing one example of an internal configuration of FIG. 1 embodiment.

FIG. 2 is a block diagram showing an electric configuration of the game apparatus 10. Referring to FIG. 2, the game apparatus 10 includes an electronic circuit card 40, and on the electronic circuit card 40, circuit components of the CPU core 42, etc are mounted. The CPU core 42 is connected with a connector 46, a RAM 48, a first GPU (Graphic Processing Unit) 52, a second GPU 54, an I/F circuit 50, an LCD controller 60, and a wireless communication unit 64 via bus 44.

The connector 46 is detachably connected with the memory card 26 as described above. The memory card 26 includes a ROM 26a and a RAM 26b. Although illustration is omitted, the ROM 26a and the RAM 26b are connected with each other via a bus, and also connected with a connector (not shown) to be connected with the connector 46. As a result, the CPU core 42 gains access to the ROM 26a and the RAM 26b.

The ROM 26a stores in advance game programs of the game to be executed by the game apparatus 10, image data like a character image, a background image, an item image, a message image, etc., and sound data like a sound effect, a BGM, an onomatopoeic sound of characters. The backup RAM 26b saves proceeding data and result data of the game.

The RAM 48 is utilized as a buffer memory or a working memory. That is, the CPU core 42 loads the programs and the data like the image data, the sound data, etc. stored in the ROM 26a of the memory card 26 into the RAM 48 to execute the loaded game program. The CPU core 42 stores temporary data, such as game data, flag data, etc. in correspondence with a progress of the game in the RAM 48.

Additionally, the game program and data like the image data, the sound data, etc. are read entirely at a time, or partially and sequentially as necessary from the ROM 26a so as to be stored into the RAM 48.

Each of the GPU 52 and 54 forms a part of a rendering means, and is constructed by a single chip ASIC, for example. When receiving a graphics command (rendering instruction) from the CPU core 42, the GPU 52 or 54 generates game image data according to the graphics command. Here, the CPU core 42 applies an image generation program (included in the game program) required to generate the game image data to both of the GPUs 52 and 54 in addition to the graphics command.

Also, the data required to execute a graphics command (image data like polygon, texture, etc.) is stored in the RAM 48, and obtained by the GPU 52 or 54.

Additionally, the GPU52 is connected with a VRAM 56, and the GPU54 is connected with a VRAM 58. The GPU52 draws the created game image data in the VRAM 56, and the GPU54 draws the created game image data in the VRAM 58.

The VRAMs 56 and 58 are connected to the LCD controller 60. The LCD controller 60 includes a register 62. The register 62 comprises, for example, one bit, and stores a data value of "0" or "1" according to an instruction from the CPU core 42. The LCD controller 60 outputs the game image data drawn in the VRAM 56 to the LCD 14 and outputs the game image data drawn in the VRAM 58 to the LCD 12 in a case that the data value of the register 62 is "0". The LCD controller 60 outputs the image data drawn in the VRAM 56 to the LCD 12, and outputs the image data drawn in the VRAM 58 to the LCD 14 in a case that the data value of the register 62 is "1".

The I/F circuit 50 is connected with the operating switch 18, the touch panel 20, the right speaker 30a and the left speaker 30b. In response to an operation of the operating switch 18, a corresponding operation signal (operation data) is input to the CPU core 42 through the I/F circuit 50. Furthermore, the coordinates data detected via the touch panel 20 is input to the CPU core 42 via the I/F circuit 50. In addition, the CPU core 42 reads from the RAM 48 the sound data necessary for the game such as a BGM, a sound effect or an onomatopoeic sound of a game character, etc., and outputs it from the right speaker 30a and the left speaker 30b via the I/F circuit 50.

In a state of two-person player mode being selected, a radio signal is transmitted and received with an opponent's game apparatus through a radio communication unit 64. That is, the radio communication unit 64 modulates communication data to be transmitted to the opponent into a radio signal to send it from an antenna, and receives a radio signal from the opponent by the same antenna to demodulate it to communication data.

In a case of playing a puzzle game by the game apparatus 10 configured as described above, a game screen shown in FIG. 3 is displayed so as to be spread across the two LCDs 12 and 14. With reference to FIG. 3, the game screen includes a game field GF defined by a top side L1 and bottom side L2, and within the game field GF, a stacked block B1, an operation block B2, an addition block B3, a game over line L3, an arrow A1, etc. are arranged.

Each of the stacked block B1, the operation block B2 and the addition block B3 is configured by one or more unit blocks, and any one of a plurality of attributes determined in advance is set to each unit block. Here, as shown in FIG. 4 (A), five attributes including red (erasable), blue (erasable), yellow (erasable), white (erasable), and black (unerasable) are prepared.

The stacked block B1 has a stacked structure in which a plurality of block lines each including three unit blocks arranged in a right and left direction (X-direction) are stacked in an up and down direction (Y direction). In what follows, an individual unit block forming the stacked block B1 is identified as shown in FIG. 4 (B). With reference to FIG. 4, three unit blocks forming a first line being closest to the top side L1 are identified from the left, such as (1, 1), (1, 2), and (1, 3). A second line directly below the first line is identified, such as (2, 1), (2, 2), and (2, 3), and the n-th line is identified, such as (n, 1), (n, 2), and (n, 3).

The operation block B2 is constructed by two unit blocks vertically arranged, arranged on the right or left side of the stacked block B1, and then moved up, down, left, and right directions in accordance with an operation by the operating switch 18 (cross switch 18a, for example.) When the operation block B2 hits against or collides with the one side surface of the stacked block B1, the operation block B2 is absorbed in the stacked block B1 to force other two unit blocks vertically arranged to being pushed out from the other side surface of the stacked block B1. The other two unit blocks thus pushed out is a new operation block B2, and then hits against the other side surface of the stacked block B1.

By thus hitting the operation block B2 against the stacked block B1 from the right and left, the arrangement of the unit blocks forming the stacked block B1 is changed. If a predetermined arrangement is completed within the stacked block B1, the aligned blocks disappear. The game score is calculated on the basis of the number of disappearing unit blocks.

For example, as shown in FIG. 5 (A), if the operation block B2 constructed by two blue unit blocks is positioned at the left of the stacked block B1, the vertical positions of the operation block B2 shall be fit in the second line and the third line of the stacked block B1 to hit the operation block B2 against the left side surface of the stacked block B1.

Then, as shown in FIG. 5 (B), the operation block B2 is absorbed from the left side surface of the stacked block B1 to thereby horizontally shift six unit blocks (2, 1), (2, 2), (2, 3), (3, 1), (3, 2), and (3, 3) positioned at the second line and the third line of the stacked block B1 by one block. The group of unit blocks (block line) thus horizontally shifting is called "horizontally shifting block B1a".

As a result, as shown in FIG. 5 (C), the operation block B2 is absorbed in the position where the unit blocks (2, 1) and (3, 1) exist, and newly arranged at the positions (2, 1) and (3, 1) of the stacked block B1. Thus, two unit blocks (2, 3) and (3, 3) are pushed out from the right side surface of the stacked block B1. The two unit blocks thus pushed out becomes a new operation block B2.

On the other hand, since as to the stacked block B1, the attribute of three unit blocks (1, 1), (2, 1), and (3, 1) vertically arranged is coincident with one another, these three unit blocks disappear as shown in FIG. 6 (A). The group of unit blocks thus disappear is called a "disappearing block B1b".

The blank corresponding to three blocks is filled in accordance with the upward movement of the unit blocks (4,1), (5,1), etc. below the "disappearing block B1b" by three blocks as shown in FIG. 6 (B) to thereby rearrange the stacked block B1. The group of unit blocks (block arrangement) thus upwardly moving is called a "vertically shifting block B1c".

Thereafter, the operation block B2 positioned at the right of the stacked block B1 hits against the right side surface of the stacked block B1 as shown in FIG. 6 (C). A collision operation as in the above description is repeated alternately from the right and the left thereafter.

Returning to FIG. 3, the game over line L3 is displayed in the vicinity of the top side L1 at a start of the game, and downwardly moves with the passage of time. If a block disappears, the stacked block B1 is sent back by the number corresponding to the number of disappearing blocks toward the top side L1. When the game over line L3 reaches the bottom L2, the game is over.

Within the low-speed area E1 being at the back of the game over line L3, that is, the area between the top side L1 and the game over line L3, a moving speed of the operation block B2 is low. As a result, a response of a collision operation is reduced.

An addition block B3 is periodically thrown in the game field GF from the bottom side L2. The thrown addition block B3 upwardly moves in the game field GF, and hits against the stacked block B1 to be a part thereof.

Furthermore, the puzzle game is prepared with a plurality of the degree of difficulties (levels) which raise the level from the easiest first level to a further difficult third level through a more difficult second level. A level-up process for proceeding to a next level is executed when the score reaches a level clear reference, and an assignment (described later) offered at a time of attainment of the reference is solved.

An arrow A1 downwardly moving along the right side of the game field GF is an index for indicating to what extent the score is close to the clear reference in the level. More specifically, the arrow A1 is arranged near the top side L1 at a start of the game, i.e., at a start of the first level. Thereafter, the arrow A1 downwardly moves in accordance with the score, and reaches the bottom side L2 when the score reaches the clear reference of the first level. Thereafter, when the second level is started after solution of the first level, the arrow A1 is displayed near the top side L1 again, and downwardly moves in accordance with the score.

Furthermore, with respect to an erasing process shown in FIG. 5 (A)-FIG. 5 (C) and FIG. 6 (A), even if a predetermined arrangement is established, the attribute of the arranged blocks is black (unerasable) as shown in FIG. 7 (A) and FIG. 7 (B), the erasing process is not executed.

However, the attribute set to each unit block is not fixed type, and can be changed as shown in FIG. 8 (A)-FIG. 8 (C), for example. It should be noted that the stacked block B1 and the operation block B2 shown in FIG. 8 (A) is similar to that in FIG. 5 (A) except for that a unit block (3, 1) in the stacked block B1 is not yellow (erasable) but black (unerasable).

In FIG. 8 (A)-FIG. 8 (C), the operation block B2 is pushed into the stacked block B1 and other operation block B2 is pushed out from the stacked block B1 similarly to FIG. 5 (A)-FIG. 5 (C). Within the stacked block B1, a disappearing block B1b is established, and the above-described block (3, 1) moves by one block by being pushed out by the operation block B2. Thus, a state occurs in which the disappearing block B1b and the black (unerasable) block are brought into contact with each other as shown in FIG. 8 (B). When the disappearing block B1b disappears in this state, the attribute of the black (unerasable) block being brought into contact with the disappearing block B1b changes to the attribute the same as that of the disappearing block B1b, i.e., blue (erasable).

Figure 9:
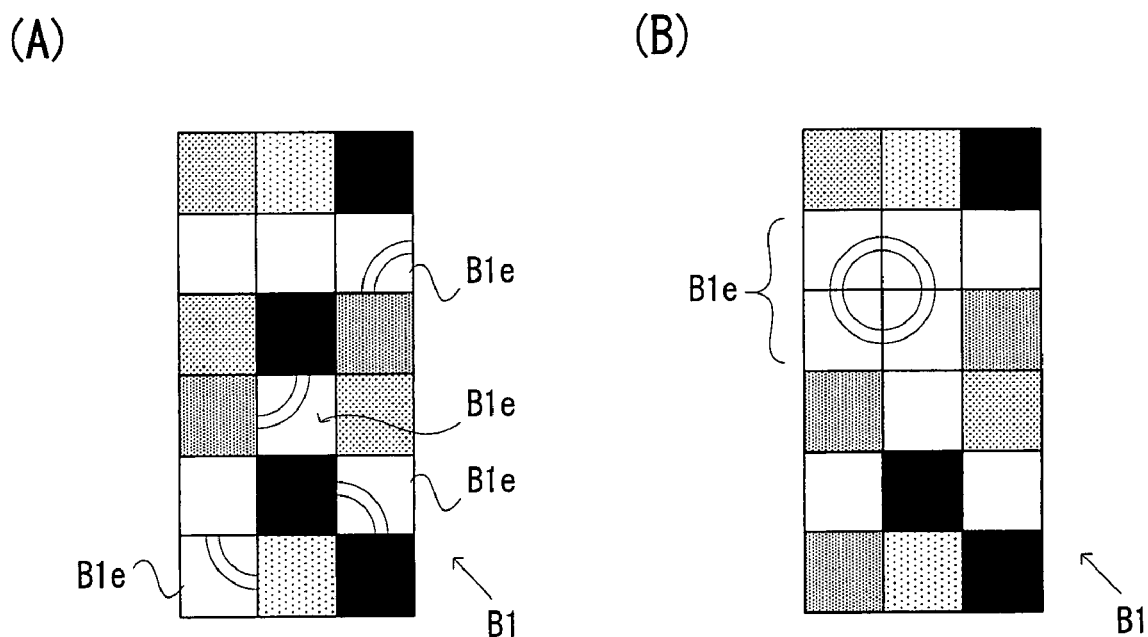
FIG. 9 (A) and FIG. 9 (B) are illustrative views showing a further changing example of a game screen applied to FIG. 1 embodiment in chronological order.

FIG. 9 (A) and FIG. 9 (B) show one example of an assignment offered when the score reaches the level clear reference. The assignment is that a collision operation shown in FIG. 10 (A)-FIG. 10 (D) is repeatedly performed on a stacked block B1 including four unit blocks (level-clear assignment block) B1e on each of which a part of a design (concentric circle here) like FIG. 9 (A) is drawn at a random position to thereby rearrange these level-clear assignment blocks B1e at a predetermined arrangement, completing a concentric circle within the stacked block B1 as in FIG. 9 (B).

More specifically, as shown in FIG. 10 (A), an operation blocks B2 including vertically arranged two unit blocks are first pushed into the stacked block B1 shown in FIG. 9 (A) at the positions of unit blocks (4, 1) and (5, 1) from the left. Thus, as shown in FIG. 10 (B), unit blocks (4, 3) and (5, 3) are pushed out from the right.

Next, the pushed two unit blocks are upwardly moved by three blocks as a new operation block B2, and pushed into the positions of unit blocks (2, 3) and (3, 3) from the right as shown in FIG. 10 (C). Thus, the upper half of the concentric circle shown in FIG. 9 (B) is completed as shown in FIG. 10 (D). At this time, the unit blocks (4, 3) and (5, 3) are pushed out from the left. In what follows, by repeating a similar collision operation, the entire of a concentric circle is completed in the end.

Figure 11:
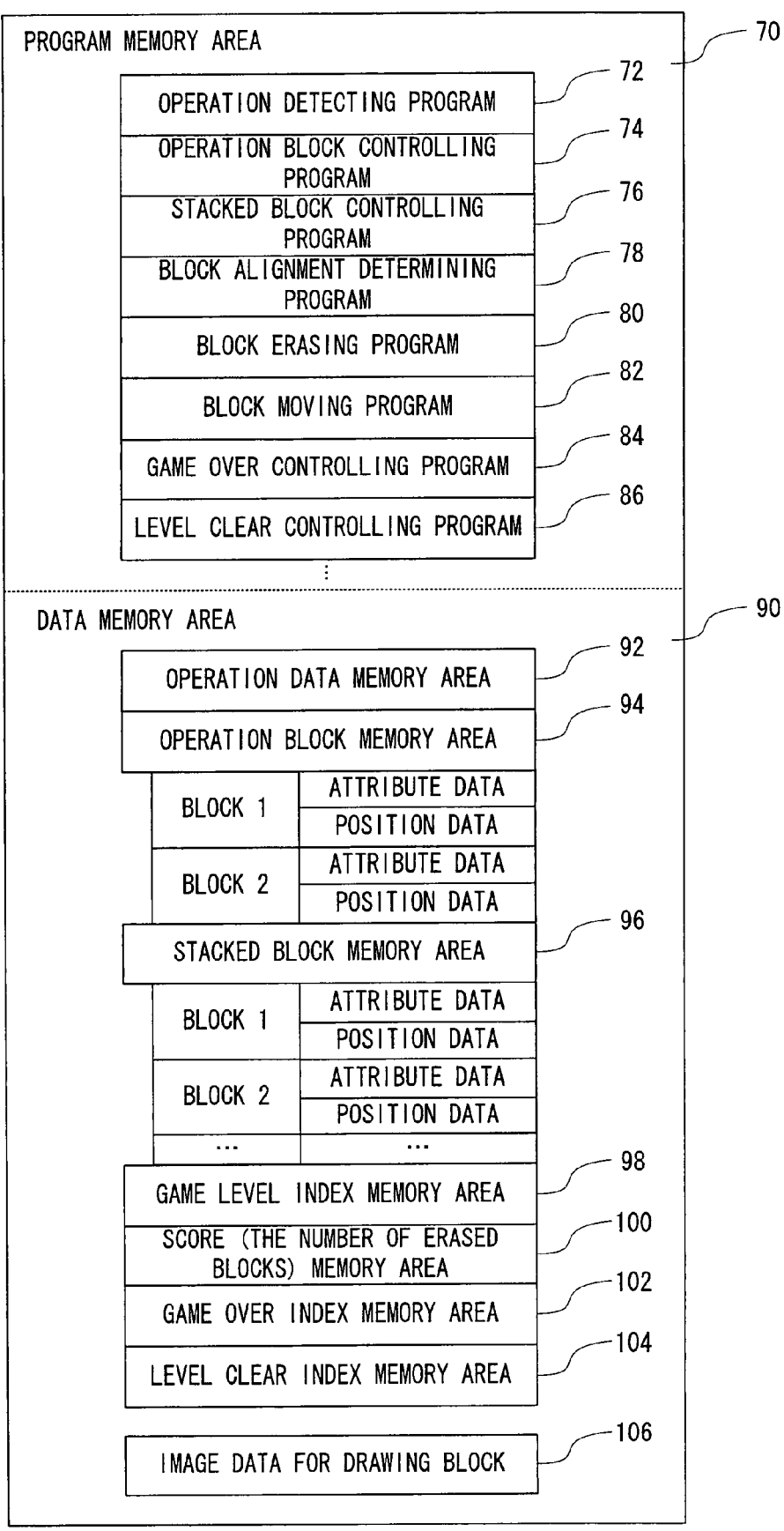
FIG. 11 is an illustrative view showing one example of a mapping state of a RAM applied to FIG. 1 embodiment.

FIG. 11 shows a memory map of the RAM 48 in a case that the puzzle game as described above is played. With reference to FIG. 11, the RAM 48 includes a program memory area 70 for storing a program loaded from the ROM 26a of the memory card 26. The program to be loaded includes an operation detecting program 72, an operation block controlling program 74, a stacked block controlling program 76, a block alignment determining program 78, a block erasing program 80, block moving program 82, a game over controlling program 84, a level clear controlling program 86, etc.

The program memory area 70 stores, although illustration is omitted, other various programs required to advance a game such as a program of generating and outputting a game image and a game sound.

The operation detecting program 72 is a program for detecting an operation by the switch 18. The operation block controlling program 74 is a program for controlling a position and an attribute of the operation block B2. The stacked block controlling program 76 is a program for controlling a position and an attribute of each of the stacked block B1 (and addition block B3). The block alignment determining program 78 is a program for determining whether or not a predetermined block arrangement in the stacked block B1 is completed. The block erasing program 80 is a program for erasing blocks in the predetermined arrangement from the stacked block B1.

The block moving program 82 is a program for horizontally or vertically shifting a part of the stacked block B1 (see FIG. 5 (B), FIG. 6 (B)), and throwing an addition block B3. The game over controlling program 84 is a program for moving a game over line (L3: see FIG. 3), and determining whether or not a game over condition is satisfied to thereby perform a game over process when the game over condition is satisfied.

The level clear controlling program 86 is a program for moving an arrow (A1: see FIG. 3) indicative of a degree of attainment to a level clear reference, determining whether or not a score attains the clear reference, offering an assignment at a time of attainment of the level clear reference, and executing a level-clearing process when the assignment is solved.

Furthermore, the RAM 48 includes data memory area 90. The data memory area 90 includes an operation data memory area 92, an operation block memory area 94, a stacked block memory area 96, a game level index memory area 98, a score memory area 100, a game over index memory area 102, a level clear index memory area 104, etc.

The operation data memory area 92 is an area for storing operation data corresponding to an operation detected by the operation detecting program 72. The operation block memory area 94 is an area for storing data and the like relating to an operation block B2, and specifically stores attribute data (color and erasable or unerasable) and position data for every unit block.

The stacked block memory area 96 is an area for storing data and the like relating to a stacked block B1 (and addition block B3), and specifically stores attribute data and position data for every unit block.

The game level index memory area 98 is an area for storing a game level index, and the score memory area 100 is an area for storing a score. The game over index memory area 102 is an area for storing a game over index (position of a game over line), and the level clear index memory area 104 is an area for storing a level clear index (position of the arrow A1).

The RAM 48 further stores various data required to advance a game such as block rendering data 106, etc.

Figure 12:
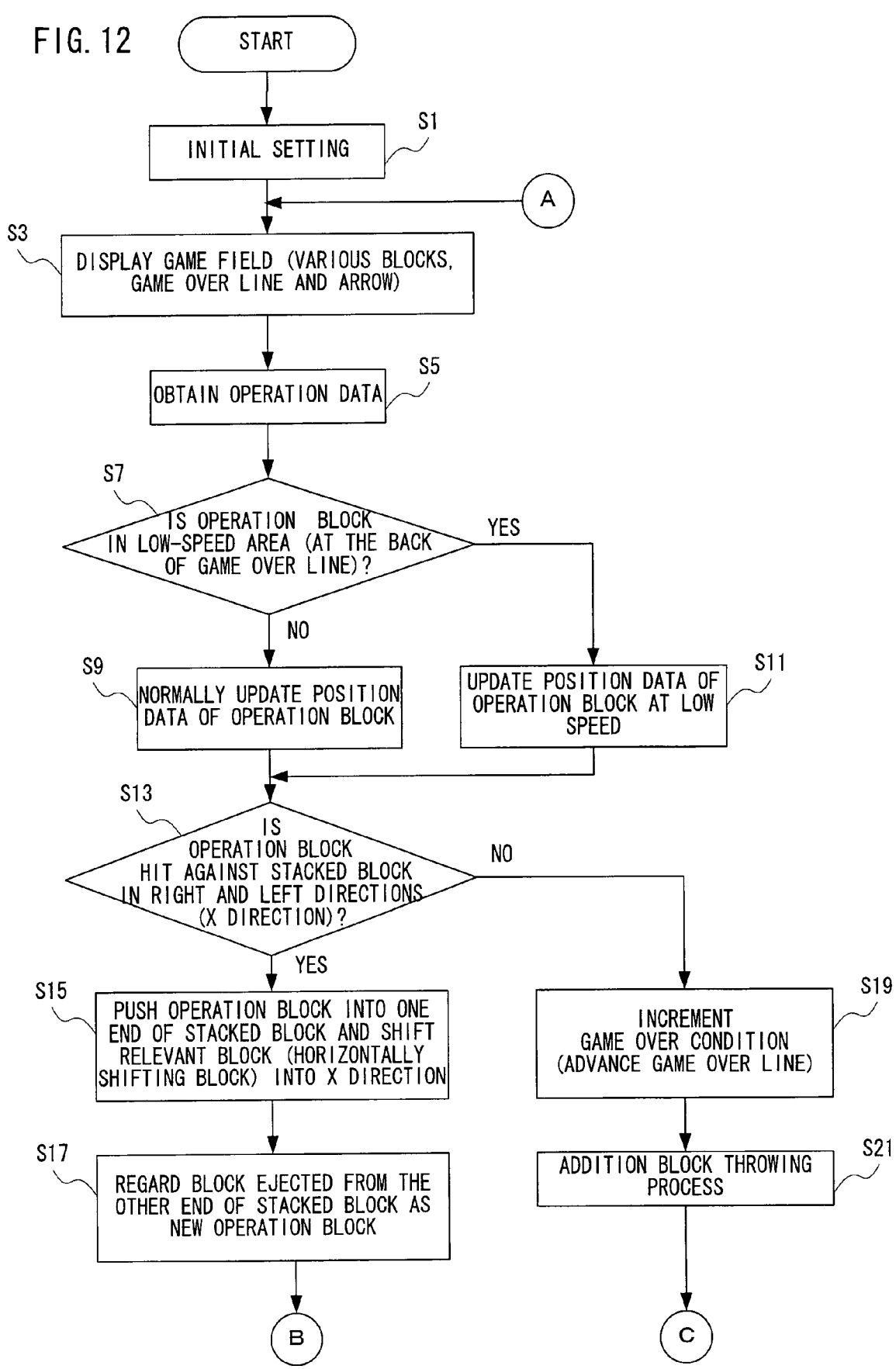
FIG. 12 is a flowchart showing a part of an operation of a CPU core applied to FIG. 1 embodiment.
Figure 13:
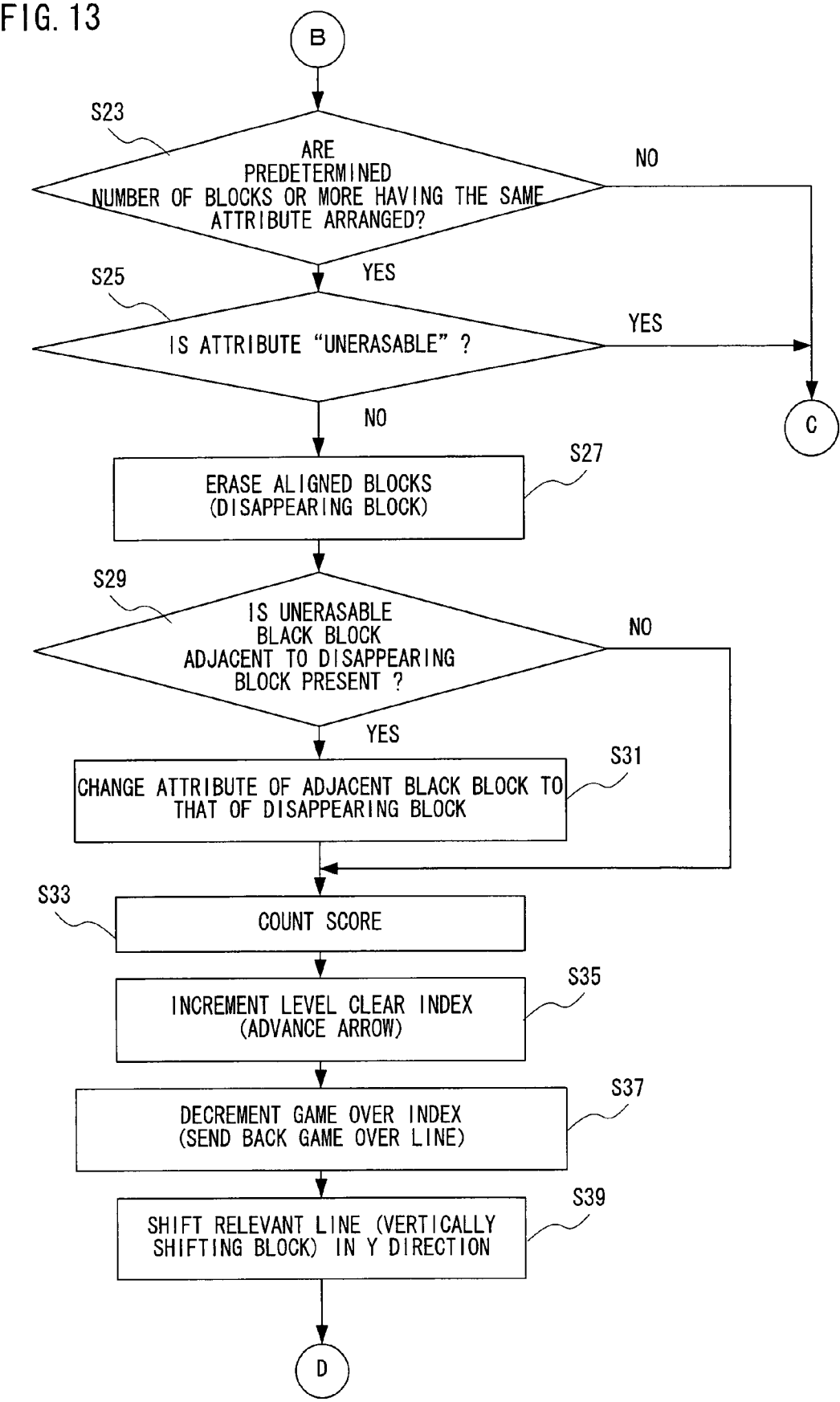
FIG. 13 is a flowchart showing another part of the operation of the CPU core applied to FIG. 1 embodiment.
Figure 14:
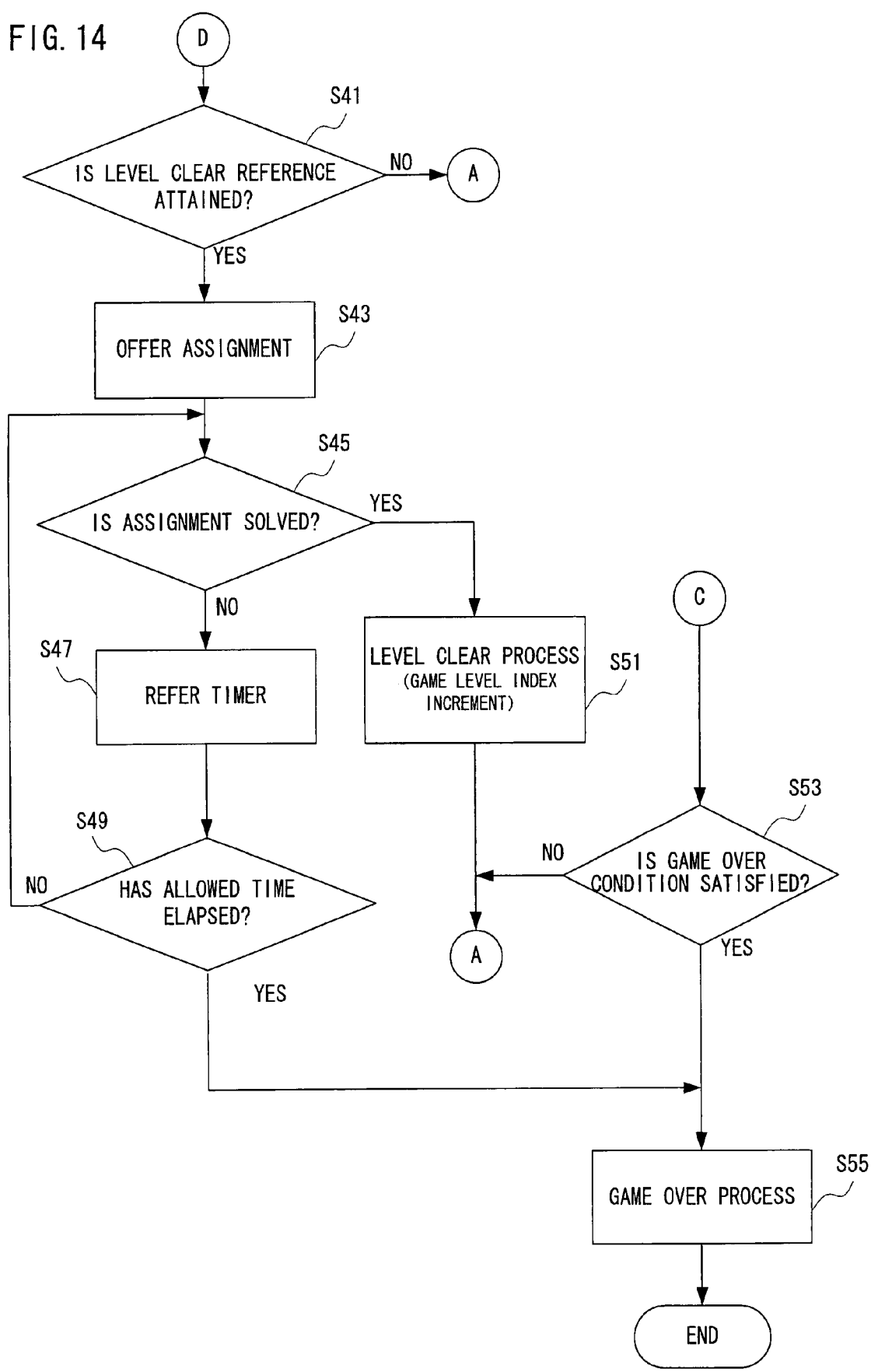
FIG. 14 is a flowchart showing the other part of the operation of the CPU core applied to FIG. 1 embodiment.

The CPU core 42 executes processing according to a flowchart in FIG. 12 to FIG. 14 on the basis of the above-described programs and data. With reference to FIG. 12, an initial setting is first performed in a step S1. More specifically, a preparation for starting the game is performed, such as setting an initial value in each of the operation data memory area 92, the operation block memory area 94, the stacked block memory area 96, the game level index memory area 98, the score memory area 100, the game over index memory area 102, and the level clear index memory area 104.

In a next step S3, a game field GF including a stacked block B1, an operation block B2, a game over line L3, an arrow A1, etc. is displayed on the basis of the data in each of the above-described memory areas 92-104 so as to be spread over the LCDs 12 and 14 (see FIG. 3). It should be noted that directly after the initial setting, both of the game over line L3 and the arrow A1 are arranged near the top side L1 of the game field GF.

In a step S5, operation data is obtained from the operating switch 18 through the operation data IF circuit 50. The obtained operation data is stored in the operation data memory area 92 of the RAM 48. In a step S7, it is determined whether or not an operation block B2 is within the low-speed area E1 on the basis of the position data in the operation block memory area 94. If "NO" here, the process proceeds to a step S13 after passing through the process in a step S9, and if "YES", the process proceeds to the step S13 after passing through the process in a step S11.

In the step S9, the position data in the operation block memory area 94 is normally updated, and in a step S11, the position data in the operation block memory area 94 is updated at a low speed. The low-speed-update is an updating method for making change of the position data of the operation block B2 in response to an operation input less than that in the normal update, for example. Thus, the operation block B2 moves slowly within the low-speed area E1.

In the step S13, it is determined whether or not the operation block B2 collides the stacked block B1 in right and left directions (X-direction). If "YES" here, the process proceeds to a step S23 after passing through the processing in steps S15 and S17, and if "NO", the process proceeds to a step S53 after passing through the processing in steps S19 and S21.

In the step S15, the position data in the operation block memory area 94 and a part of the position data in the stacked block memory area 96 (position data corresponding to a horizontally shifting block B1a) are updated to thereby push the operation block B2 into the stacked block B1, and horizontally shift the horizontally shifting block B1a, pushing out an end of the horizontally shifting block B1a being opposite to the end brought into contact with the operation block B2 from the stacked block B1 (see FIG. 5(A) and FIG. 5(B)).

In the step S17, a part of data in the stacked block memory area 96 (that is, data of the block pushed out from the stacked block B1) is moved to the operation block memory area 94. Thus, the block pushed out from the stacked block B1 becomes an object to be controlled by the operating switch 18, that is, a new operation block B2 (see FIG. 5 (C)).

In the step S19, a game over index stored in the game over index memory area 102 is incremented. In the step S21, the data of an addition block B3 (see FIG. 3) is written to the stacked block memory area 96. Thus, the addition block B3 is thrown into the game field GF.

Referring to FIG. 13, in the step S23, it is determined whether or not a predetermined arrangement is completed in the stacked block B1, and specifically whether or not a predetermined number (three, here) of the unit blocks or more with the same attribute are arranged in the X-direction or Y-direction on the basis of data in the stacked block memory area 96. If "YES" here, the process shifts to a step S25 to determine whether or not the attribute of the arranged blocks are "unerasable". If "NO" in the step S23, or if "YES" in the S25, the process proceeds to a step S55.

If "NO" in the step S25, the process shifts to a step S27 to erase data of the disappearing blocks B1b from the stacked block memory area 96. Thus, the arranged blocks disappear. (see FIG. 5 (C) and FIG. 6 (A))

In a succeeding step S29, it is determined on the basis of the data in the stacked block memory area 96 whether or not a block (adjacent black block B1d: see FIG. 8 (B)) adjacent to the disappearing block B1b and having an attribute of black (unerasable) is present. If "NO" here, the process directly proceeds to a step S33, and if "YES", the process proceeds to the step S33 after passing through the process in a step S31. In the step S33, the attribute of the adjacent black block B1d is changed to that of the disappearing block B1b. Thus, the color of the adjacent black block Bid becomes a color the same as the disappearing block B1b (see FIG. 8 (B)) so as to be erasable by a collision operation thereafter.

In the step S33, a score is calculated on the basis of the number of unit blocks erased in the step S27. In a next step S35, the level clear index is incremented on the basis of the calculated score to thereby downwardly move the arrow A1. In a following step S37, a game over index is decremented, to thereby send back the game over line L3.

In a succeeding step S39, the vertically shifting block B1c (see FIG. 6 (B)) below is shifted upwardly in order to fill in the blank occurring in the stacked block B 1.

With reference to FIG. 14, in a step S41, it is determined whether or not a score stored in the score memory area 100 attains the level clear reference, and if "NO" here, the process returns to the step S3. If "YES" in the step S41, an assignment is offered in a step S43, and it is then determined whether or not the assignment is solved in a step S45. One example is that four level-clear assignment blocks B1e on each of which a part of the concentric circle is drawn is displayed at the random position within the stacked block B1 as shown in FIG. 9 (A), and it is determined whether or not the concentric circle is completed within the stacked block B1 as shown in FIG. 9 (B).

If "NO" in the step S45, the process shifts to a step S47 to referrer to a timer T, and in a next step S49, it is determined whether or not an allowed time has elapsed from offering the assignment. If an allowed time has not yet elapsed, the process returns to the step S45, while if a specific time has elapsed, the process proceeds to a step S55.

Although illustration is omitted, the loop processing of the steps S45-S49 includes the processing similar to that in the steps S5-S17, that is, the processing of moving a block in response to a collision operation.

When the assignment is attained within the allowed time, the process shift from the step S45 to the step S51 to execute a level-clearing processing for advancing to a next level. The processing includes processing for incrementing the game level index stored in the game level index memory area 98. After the level clear, the process returns to the step S3.

In the step S53, it is determined whether or not a game over condition is satisfied. If "NO" here, the process returns to the step S3 while if "YES", the process proceeds to the step S55. In the step S55, the game over processing is executed to end the game.

As understood from the above description, in this embodiment, when the operation block B2 horizontally collides the stacked block B1, a part of the stacked block (horizontally shifting block B1a) facing the operation block B2 in the stacked block B1 is horizontally shifted to allow the operation block B2 to be absorbed in the stacked block B1, and a block at an end being opposite to the end facing the operation block B2 in the shifted stacked block is ejected from the stacked block B1. The block thus ejected can collide with the stacked block B1 as a new operation block. By repeating such a collision operation, the arrangement of the stacked block B1 can dynamically be changed, capable of enhancing a strategic characteristic of a puzzle game.

Furthermore, in this embodiment, a processing (S23-S27) for erasing the aligned blocks in the stacked block B1 is executed after a processing (S15 and S17) of pushing the operation block B2 into the stacked block B1 and ejecting a new operation block B2 from the stacked block B1, but this may be executed before it. Furthermore, the processing in the steps S35-S39 may be changed in order. Thus, an executing order of a series of the processing shown in the flowchart in FIG. 12-FIG. 14 may adequately be changed.

In the above description, a description is made on a case that the invention is applied to the game apparatus 10 as one example, the invention can be applied to an apparatus furnished with a display means, an operating means, a storing means, and a computer (personal computer, hand-held phone, PDA, digital television, etc.)

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recording medium recording a game program, wherein
said game program causes a computer of a game apparatus having an operating device to be operated by a player, a display for displaying a game field including an operation block as an object to be controlled by said operating device and a group of blocks formed by blocks to be erased when an arrangement condition is satisfied, a first storage unit for storing each of attribute data and position data as to said operation block, and a second storage unit for storing each of attribute data and position data as to said group of blocks for each block to execute:
moving said operation block within said game field by updating the position data of the first storage unit in response to an operation by said operating device;

determining on the basis of the position data of said first storage unit and the position data of said second storage unit whether or not said operation block collides with said group of blocks within said game field;

absorbing, when it is determined that said operation block collided with said group of blocks within the game field, said operation block in said group of blocks by shifting a first part of blocks facing said operation block and aligned in a moving direction of said operation block in said group of blocks to said moving direction by updating a part of the position data of said second storage unit and moving each of the attribute data and the position data of said first storage unit to said second storage unit to thereby; and ejecting an end being opposite to the end of said first part of blocks facing said operation block as a new operation block from said group of blocks in accordance with the absorbing process by moving a part of the attribute data of said second storage unit to said first storage unit and updating the position data of said first storage unit.

2. A recording medium recording a game program in accordance with claim 1, wherein within said game field, said group of blocks arranged at the center of a first direction, and has a stacked structure in which blocks are paved in both of said first direction and a second direction crossing said first direction, within said game field, said operation block is arranged on one side with respect to said group of blocks in said first direction, and moves in any one of said first direction and said second direction in response to an operation by said operating device, the collision determination determines whether or not said operation block collides said group of blocks in said first direction, said absorbing absorbs said operation block in one end of said group of blocks in said first direction by shifting said first part of blocks in said first direction, and said ejecting ejects said new operation block from the other end of said group of blocks in said first direction.

3. A recording medium storing a game program in accordance with claim 1, wherein said game program causes said computer to further execute:

determining whether or not blocks having the same attribute in said group of blocks is in a first arrangement on the basis of each of the attribute data and the position data of said second storage unit; and erasing a second part of blocks including blocks having the same attribute and being in the first arrangement within said game field by updating each of the attribute data and the position data of said second storage unit when the determination result of whether or not blocks having the same attribute in said group of blocks is in a first arrangement is affirmative.

4. A recording medium recording a game program in accordance with claim 3, wherein said game program causes said computer to remove a block having an attribute of unerasable from an object to be erased by said erasing.

5. A recording medium recording a game program in accordance with claim 4, wherein said game program causes said computer to further perform:

determining whether or not an adjacent unerasable block being adjacent to said second part of blocks and having an attribute of unerasable is present by referring to each of the position data and the attribute data of said second storage unit when the determination result of whether or not blocks having the same attribute in said group of blocks is in a first arrangement is affirmative; and changing the attribute of said adjacent unerasable block to an attribute the same as that of said second part of blocks by updating a part of the attribute data of said second storage unit when the determination result of whether or not an adjacent unerasable block being adjacent to said second part of blocks and having an attribute of unerasable is present is affirmative.

6. A recording medium recording a game program in accordance with claim 3, wherein said game apparatus further comprises a third storage unit for storing level clear index data indicative of to what extent the number of erasable blocks is close to a level clear reference, and said game program causes said computer to further perform:

counting the number of erased blocks;

a first index updating for updating level clear index data of said third storage unit on the basis of the counting result;

offering an assignment through said display when the updating result by said first index updating indicates attainment of the level clear reference;

determining whether or not the offered assignment is solved by an operation of said operating device; and executing a level-clearing process to proceed to a new game level when the determination result of whether or not the offered assignment is solved by an operation of said operating device is affirmative.

7. A recording medium recording a game program in accordance with claim 6, wherein said offering causes a level-clear assignment block having an attribute of level-clear assignment to appear at a random position within said group of blocks by updating a part of the attribute data of said second storage unit, and determining whether or not the offered assignment is solved by an operation of said operating device determines whether or not said level-clear assignment block is in a second alignment within said group of blocks on the basis of each of the attribute data and the position data of the second storage unit.

8. A recording medium storing a game program in accordance with claim 6, wherein said game field further includes a first character moving in accordance with the updating process by said first index updating.

9. A recording medium recording a game program in accordance with claim 6, wherein said game apparatus further comprises a timer for counting an elapsed time from a game start and a fourth storage unit for storing game over index data indicative of a remaining time until the game over, said game program causes said computer to further execute a second index updating for updating game over index data of said fourth storage unit on the basis of said timer value and the counting result, and said game field further includes a second character for moving in accordance with the updating process by said second index updating.

10. A recording medium recording a game program in accordance with claim 9, wherein said second character is a game over line extending in said first direction and moving in said second direction within said game field, said game over line advances from one to other of said second direction with the passage of time, and is sent back from the other to the one of said second direction depending on the number of erased blocks, and moving said operation block within said game field makes a moving speed of said operation block different depending on where said operation block is in front of said game over line and at the back thereof.

11. A game apparatus, comprising:

an operating device to be operated by a player;

a display for displaying a game field including an operation block as an object to be controlled by said operating device and a group of blocks formed by blocks to be erased when a arrangement condition is satisfied;

a first storage unit for storing each of attribute data and position data as to said operation block;

a second storage unit for storing each of attribute data and position data as to said group of blocks for each block;

a moving unit for moving said operation block within said game field by updating the position data of said first storage unit in response to an operation by said operating device;

a collision determiner for determining whether or not said operation block collides said group of blocks within said game field on the basis of the position data of said first storage unit and the position data of said second storage unit;

an absorbing unit for, when the determination result by said collision determiner is affirmative, absorbing said operation block in said group of blocks by shifting a first part of blocks facing said operation block and aligned in a moving direction of said operation block in said group of blocks to said moving direction by updating a part of the position data of said second storage unit and moving each of the attribute data and the position data of said first storage unit to said second storage unit to thereby; and an ejecting unit for ejecting an end being opposite to the end of said first part of blocks facing said operation block as a new operation block from said group of blocks in accordance with the absorbing process by said absorbing unit by moving a part of the attribute data of said second storage unit to said first storage unit and updating the position data of said first storage unit.

* * * * *